Nov. 15, 1927.  
E. F. PITMAN  
1,648,994  
GLARE SHIELD  
Filed Jan. 20, 1926
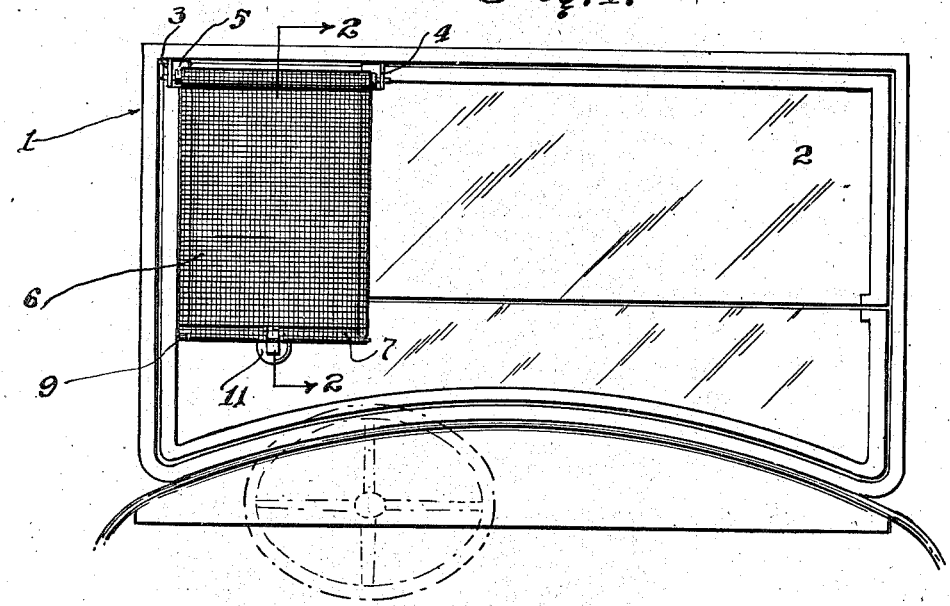
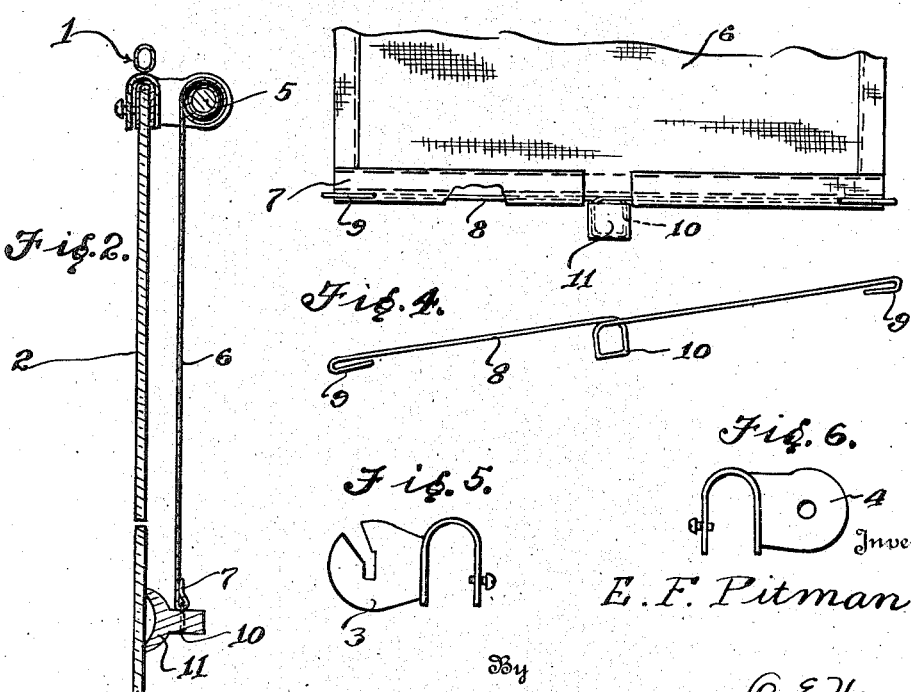
Inventor  
E. F. Pitman  
By  
O. E. Howe  
Attorney Patented Nov. 15, 1927.

1,648,994

UNITED STATES PATENT OFFICE.

ENOCH F. PITMAN, OF BEND, OREGON.

GLARE SHIELD.

Application filed January 20, 1926. Serial No. 82,485.

This invention relates to glare shields and more particularly to a glare shield which is adapted to be held in place to the inside of a motor vehicle wind shield to protect the driver on whose motor vehicle the glare shield is used from the headlight glare of an oncoming automobile or truck.

The principal object of the invention is the provision of a glare shield in the shape of a semi-transparent curtain which can be pulled down when in use and which can be rolled up on a roller out of the way of the driver when not in use.

Another object of the invention is the provision of novel vacuum means to retain the curtain when in a pulled down position.

Other objects will appear as the disclosure progresses. The drawings are intended merely to indicate a possible embodiment of the invention. It is obvious that the actual needs of manufacture may necessitate certain mechanical changes. It is therefore not intended to limit the invention to the embodiment illustrated but rather to define such limits in the appended claim.

For a more general description of the invention, attention is now called to the drawings in which Fig. 1 is a view of the glare shield attached to the wind shield of an automobile.

Fig. 2 is a section on line 2—2 of Fig 1.

Fig. 3 is a detail of the lower portion of the curtain.

Fig. 4 is a perspective view of the curtain rod.

Figs. 5 and 6 are side views of the brackets.

Referring to the drawings in detail in which like reference characters denote like parts throughout the specification, numeral 1 designates the windshield frame, 2 the glass and 3 and 4 brackets fastened to the frame 1 for supporting the roller 5 on which the curtain 6 is adapted to roll up.

Fastened to the lower end of the curtain by a turned up flap 7 is a curtain rod 8. The ends of the rod are turned over as at 9 and in the center is a loop 10 into which fits the vacuum cup 11.

This glare shield is used in the evening or early morning when driving toward the sun. The curtain is preferably made of a semi-opaque textile material of any suitable shade which when pulled down will protect the eyes of the driver from the glare of the headlights of an oncoming automobile. The texture of the curtain is of such nature as will not obstruct the view of the driver but will absorb the glare and allow the softer light to reach the driver.

For retaining the curtain in place in any desired position, the vacuum cup is slightly moistened and pressed against the glass. A sufficient amount of vacuum will then be formed in the cup to firmly hold it against the glass against the pull of the coiled spring within the shade roller and also from flopping in the wind.

Having thus described my invention, what I desire to secure by United States Letters Patent is:

In a glare shield for wind shields, a shade mounted on a spring actuated roller, said shade having a turned up flap at the bottom supporting a rod, said rod having bent over ends and looped in the middle around the shank of a vacuum cup, said vacuum cup adapted to hold the shade in a downward position against the upward pull of the shade roller.

In testimony whereof I affix my signature.

ENOCH F. PITMAN.